United States Patent [19]

Ohira et al.

[11] Patent Number: 5,378,794
[45] Date of Patent: Jan. 3, 1995

[54] PROCESS FOR THE PRODUCTION OF AROMATIC PHOSPHORUS-CONTAINING POLYMER

[75] Inventors: Yoji Ohira; Tetsuya Fujita, both of Mihara, Japan

[73] Assignee: Teijin Chemicals Ltd., Tokyo, Japan

[21] Appl. No.: 166,363

[22] Filed: Dec. 14, 1993

[30] Foreign Application Priority Data

Dec. 15, 1992 [JP] Japan .................... 4-334480

[51] Int. Cl.$^6$ ............................................. C08G 79/02
[52] U.S. Cl. ........................................................ 528/167
[58] Field of Search ............................................. 528/167

[56] References Cited

U.S. PATENT DOCUMENTS 2,979,484  4/1961  Redfarn ........................... 528/167

*Primary Examiner*—John Kight, III
*Assistant Examiner*—Terressa Mosley
*Attorney, Agent, or Firm*—Sherman and Shalloway

[57] ABSTRACT

A process for the production of an aromatic phosphorus-containing polymer, comprising (i) reacting phosphorus pentachloride with an aromatic dihydroxy compound and then reacting the reaction product with an aromatic monohydroxy compound, or (ii) allowing phosphorus pentachloride, an aromatic dihydroxy compound and an aromatic monohydroxy compound to react concurrently, to form an intermediate polymer, and then hydrolyzing the intermediate polymer, the above process being capable of giving an aromatic phosphorus-containing polymer in the absence of a catalyst for a short period of time at a relatively low temperature.

20 Claims, No Drawings

PROCESS FOR THE PRODUCTION OF AROMATIC PHOSPHORUS-CONTAINING POLYMER

BACKGROUND OF THE INVENTION

1. Field of the Invention

The present invention relates to a process for the production of a phosphate-based aromatic phosphorus-containing polymer. More specifically, it relates to a novel process for the production of a phosphate-based aromatic phosphorus-containing polymer, in which phosphorus pentachloride is used as a component for a phosphorus material.

2. Prior Art of the Invention

Phosphorus-containing organic compounds are attracting attention as highly functional materials for high molecular weight compounds (resins). Above all, a phosphate-based aromatic phosphorus-containing polymer is useful as a flame retardant, a stabilizer, a plasticizer, a compatibilizer and a lubricant for high molecular weight compounds (resins).

A phosphate-based aromatic phosphorus-containing polymer has been hitherto produced by a method in which phosphorus oxychloride, dihydric phenol and monohydric phenol are allowed to react in the presence of a proper catalyst (Lewis acid) such as aluminum chloride or a hydrogenchloride scavenger such as an amine. However, the above method involves a problem in that it takes time to remove and dispose of the used catalyst. There is also known a method which dichlorophenyl phosphate and dihydric phenol are allowed to react in the absence of a catalyst (Polymer, 757, Apr. 29, 1988), while this method has a defect in that the reaction takes a long period of time. Further, a phosphate-based phosphorus-containing polymer can be produced by an ester interchange reaction of a combination of dihydric phenol and triphenyl phosphate (Japanese Patent Publication No. 40735/1991). while the defect with this production is that the required reaction conditions are so severe that the reactor and the procedures for the reaction are complicated.

SUMMARY OF THE INVENTION

It is an object of the present invention provide a process for the production of a phosphate-based aromatic phosphorus-containing polymer, in which the above production can be carried out for a relatively short period of time in the absence of a catalyst.

It is another object of the present invention to provide a process for the production of a phosphate-based phosphorus-containing polymer, in which the above production can be carried out under relatively moderate reaction conditions with relatively facile procedures.

It is still another object of the present invention to provide a process for the production of phosphate-based phosphorus-containing polymer which can be advantageously used as a highly functional material, particularly as a flame retardant, for high molecular weight compounds.

Other objects and advantages of the present invention will be apparent from the following description.

According to the present invention, the above objects and advantages of the present invention will be achieved by a process for the production of an aromatic phosphorus-containing polymer, which comprises the steps of;

(A) (A-1) reacting phosphorus pentachloride with an aromatic dihydroxy compound of the formula (I),

HO—Ar—OH  (I)

wherein two OHs are present in positions where the two OHs do not bond to one phosphorus pentachloride molecule, and Ar is an aromatic hydrocarbon skeleton of the formula,

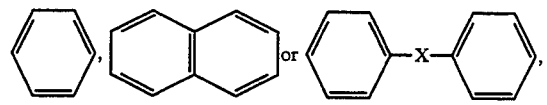

in which —X— is a single bond, —O—, —C(O)—, —CH$_2$—, —S—, —SO$_2$—, an alkylidene group having 2 to 6 carbon atoms or a cycloalkylidene group having 3 to 6 carbon atoms, provided that Ar may be substituted with at least one selected from the group consisting of a lower alkyl group, a lower alkoxy group and a halogen atom, to form a reaction product of the step (A-1), and then reacting the reaction product with an aromatic monohydroxy compound of the formula (II)

HO—Ar'  (II)

wherein Ar' is an aromatic hydrocarbon skeleton selected from those defined as Ar in the formula (I), or (A-2) allowing a mixture of phosphorus pentachloride, the aromatic dihydroxy compound of the above formula (I) and the aromatic monohydroxy compound of the above formula (II), to form an intermediate polymer, and (B) reacting the intermediate polymer with water, an alcohol, an aqueous alcoholic solution or an aqueous alkaline solution.

The above process of the present invention can be summarized as a process for the production of a phosphate-based aromatic phosphorus-containing polymer, in which the intermediate polymer is obtained either by (A-1) reacting phosphorus pentachloride with the aromatic dihydroxy compound (I) and reacting the resultant reaction product with the aromatic monohydroxy compound (II), or by (A-2) allowing phosphorus pentachloride, the aromatic dihydroxy compound (I) and the aromatic monohydroxy compound (II) to react at the same time, and then the intermediate polymer is hydrolyzed.

DETAILED DESCRIPTION OF THE INVENTION

The present invention will be detailed hereinafter.

In the process of the present invention, phosphorus pentachloride is used as a phosphorus material. The aromatic dihydroxy compound which is allowed to react with the phosphorus pentachloride has the following formula (I).

HO—Ar—OH  (I)

In the process of the present invention, the aromatic dihydroxy compound of the above formula (I) reacts as a bifunctional phenolic substance and contributes towards the formation of a polymer. In the aromatic dihydroxy compound of the formula (I), therefore, the two OHs should be present in positions where the two OHs do not bond to one phosphorus pentachloride molecule (for example, the two OHs should not bond to two neighboring carbon atoms of Ar).

In the above formula (I), Ar is an aromatic hydrocarbon skeleton such as a single ring or benzene skeleton,

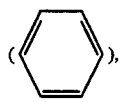

a naphthalene skeleton,

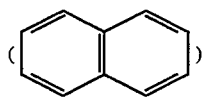

or
a diphenyl type skeleton.

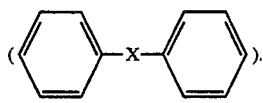

Each of these aromatic hydrocarbon skeletons (Ar) bonds to two hydroxy (OH) groups.

The position of one of the two hydroxy groups on the benzene skeleton is preferably the m-position or p-position, more preferably the p-position, relative to the position of the other. The positions of the two hydroxy groups on the naphthalene skeleton are preferably 1,5-positions, 1,6-positions, 1,7-positions, 2,6-positions or 2,7-positions, more preferably 2,6-positions or 2,7-positions. The positions of the two hydroxy groups on the diphenyl type skeleton are preferably 4,4'-positions, 3,4'-positions or 3,3'-positions.

Further, the nucleic carbons of the aromatic hydrocarbon skeleton (Ar) may be substituted with at least one of a lower alkyl group, a lower alkoxy group or a halogen atom. Examples of these substituents include (i) a lower alkyl group having 1 to 5 carbon atoms such as methyl, ethyl, n-propyl, isopropyl, n-butyl and isobutyl, (ii) a lower alkoxy group having 1 to 5 carbon atoms such as methoxy, ethoxy, n-propoxy, n-butoxy and t-butoxy, and (iii) halogen atoms such as fluorine, chlorine, bromine and iodine. The aromatic hydrocarbon skeleton (At) may contain at least one of the above lower alkyl group, lower alkoxy group and halogen atoms, and the number of these substituents selected from the lower alkyl group, lower alkoxy group and halogen atoms is 1 to 9, preferably 1 to 4, so long as the reaction is not affected.

When Ar in the above formula (I) is a diphenyl type skeleton, —X— is a single bond, —O—, —C(O)—, —CH2—, —S—, —SO2—, an alkylidene group having 2 to 6 carbon atoms or a cycloalkylidene group having 3 to 6 carbon atoms. Of these, a

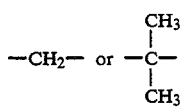

is preferred.

Specific examples of the above aromatic dihydroxy compound of the formula (I) include 2,2-bis(4-hydroxyphenyl)propane, 1,1-bis(4hydroxyphenyl)ethane, bis(4-hydroxyphenyl)methane, 1,1-bis(4-hydroxyphenyl)cyclohexane, 2,2-bis(4-hydroxy-3,5-dimethylphenyl)propane, 2,2-bis(4-hydroxy-3,5-dibromophenyl)propane, 2,2-bis(4-hydroxy-3-methylphenyl)propane, bis(4-hydroxyphenyl)sulfide, bis(4-hydroxyphenyl)sulfone, hydroquinone, 4,4'-biphenol and resorcin. These dihydroxy compounds may be used alone or in combination.

The aromatic monohydroxy compound used as another raw material in the process of the present invention has the following formula (II).

HO—Ar'  (II)

In the above formula (II), Ar' is an aromatic hydrocarbon skeleton, and is selected from those defined as Ar in the formula (I). That is, Ar' is a benzene skeleton,

a naphthalene skeleton,

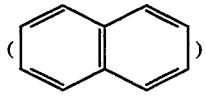

or a diphenyl type skeleton.

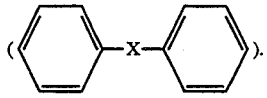

One hydroxy group bonds to the nucleic carbon of the aromatic hydrocarbon skeleton (Ar'). Further, the nucleic carbons of the aromatic hydrocarbon skeleton (Ar') may be substituted with at least one selected from the group consisting of a lower alkyl group, a lower alkoxy group and a halogen atom. Specific examples of these substituents are those specified concerning Ar in the formula (I).

When Ar' is a diphenyl type skeleton, examples of —X— are those specified concerning Ar in the formula (I), and a single bond or —CH2— is preferred.

Specific examples of the aromatic monohydroxy compound of the above formula (II) includes phenol, 4-methylphenol, 4-isopropylphenol, 4-t-butylphenol, 4-n-butylphenol, 4-n-pentylphenol, 4-neopentylphenol, 4-n-hexylphenol, 4-n-heptylphenol, 4-n-octylphenol, 4-n-nonylphenol, 4-phenylphenol, 6-phenylphenol, 4-cumylphenol, 4-methoxyphenol, 4-phenoxyphenol, 4-bromophenol, 2,4,6-tribromophenol, 2,6-dibromo-4- cumylphenol, 2,4,6-trichlorophenol, 1-naphthol and 2-naphthol. These aromatic monohydroxy compounds may be used alone or in combination.

The process for the production of an aromatic phosphorus-containing polymer, provided by the present invention, is largely classified into the following two methods I and II. These methods I and II differ in that the aromatic monohydroxy compound is allowed to react either concurrently with, or after, the reaction of phosphorus pentachloride with the aromatic dihydroxy compound.

Method I

An aromatic phosphorus-containing polymer is obtained by the method I comprising the steps of:

(A-1) reacting phosphorus pentachloride with the aromatic dihydroxy compound of the formula (I) and then reacting the resultant reaction product with the aromatic monohydroxy compound of the formula (II) to form an intermediate polymer, and (B) reacting the above-obtained intermediate polymer with water, an alcohol, an aqueous alcoholic solution or an aqueous alkaline solution.

Method II

An aromatic phosphorus-containing polymer is obtained by the method II comprising the steps of:

(A-2) allowing phosphorus pentachloride, the aromatic dihydroxy compound of the formula (I) and the aromatic monohydroxy compound of the formula (II) to react concurrently to form an intermediate polymer, and (B) reacting the above-obtained intermediate polymer with water, an alcohol, an aqueous alcoholic solution or an aqueous alkaline solution.

In the step (A-1) of the method I, phosphorus pentachloride and the aromatic dihydroxy compound are allowed to react, whereby a polymer having a diaryloxytrichlorophosphorane type phosphorus atom unit and a triaryloxydichlorophosphorane type phosphorus atom unit is formed by a dehydrochlorination reaction. And, the polymer having the above phosphorane type phosphorus atom units is allowed to react with the aromatic monohydroxy compound to give an intermediate polymer having triaryloxydichlorophosphorane type phosphorus atom units-1' and -2".

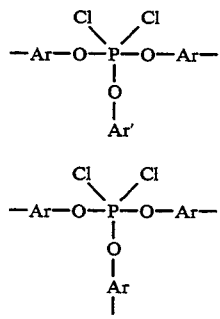

The above unit-1' and unit-2' structurally show states in which the aromatic dihydroxy compound and the aromatic monohydroxy compound bond to a phosphorus atom, but do not mean any recurring units of a polymer. In the above unit-1' and unit-2', Ar is as defined in the formula (I), and Ar' is as defined in the formula (II).

The terminal of the above intermediate polymer presumably has the structure of the following unit-3'.

In the intermediate polymer obtained in the step (A-1), the structure including the phosphorus atom is considered to be largely formed of the above units-1', -2' and -3', while the above structure is considered to be partly formed of the following units-4', -5' and-6'.

The intermediate polymer obtained in the step (A-1) of the method I is hydrolyzed in the step B without being isolated. The hydrolysis in the step B is carried out by reacting the intermediate polymer with water, an alcohol, an aqueous alcoholic solution or an aqueous alkaline solution.

In the step (A-1) of the method I, the aromatic dihydroxy compound of the formula (I) is allowed to react with phosphorus pentachloride in the absence of a solvent or in the presence of a proper solvent. The aromatic dihydroxy compound of the formula (I) is used in an amount, per mole of the phosphorus pentachloride, of 0.7 to 1.5 mol, preferably 0.8 to 1.2 mol. The above reaction in the step (A-1) is carried out at a temperature between −30° C. and 150° C., preferably between 10° C. and 120° C., for 0.5 to 12 hours, preferably 2 to 5 hours. Examples of the above solvent optionally used include dichloromethane, chloroform, dichloroethane, toluene, xylene, benzene, chlorobenzene, o-dichlorobenzene, hexane, heptane and dimethylformamide. The amount of the solvent is generally properly in the range of 0 to 10,000 times as large as that of the phosphorus pentachloride. The reaction temperature can be decreased, or the reaction rate can be increased, by blowing off the hydrogen chloride generated in the reaction by feeding nitrogen or dry air, or by reducing pressure.

The phosphorane type polymer obtained by the reaction of the aromatic dihydroxy compound with phosphorus pentachloride in the step (A-1) of the method I and the aromatic monohydroxy compound react with each other by a dehydrochlorination reaction. The aromatic monohydroxy compound is used in an amount, per mole of the phosphorus pentachloride, of 1.0 to 3.0 mol, preferably 1.2 to 2.5 mol. The above reaction is carried out at a temperature between 0° C. and 150° C., preferably between 10° C. and 130° C., for 0.5 to 6 hours, preferably 2 to 5 hours.

In the step B of the method I, the intended phosphate-based aromatic phosphorus-containing polymer is obtained by hydrolyzing the intermediate polymer obtained in the step (A-1) with water, an alcohol, an aqueous alcoholic solution or an aqueous alkaline solution in the absence of a solvent or in the presence of a proper solvent without taking out the above intermediate polymer from the reactor, or after purifying the above intermediate polymer.

When water, an alcohol or an aqueous alcoholic solution is used in the step B, it is used in an amount, per mole of the phosphorus pentachloride used in the step (A-1), of 1 to 10,000 mol, preferably 2 to 5,000 mol. When an aqueous alkaline solution is used, it is used in an amount, per mole of the phosphorus pentachloride, of 0.1 to 10 mol, preferably 1 to 7 mols, in an alkaline concentration of 0.01 to 10N. The above reaction in the step B is carried out at a temperature between 0° C. and 150° C., preferably between 20° C. and 90° C., for 0.1 to 6 hours, preferably 0.2 to 3 hours. The above alcohol is selected from lower alcohols having 4 or less carbon atoms such as methanol, ethanol and isopropanol. The alkaline is preferably selected from sodium hydroxide, potassium hydroxide, sodium hydrogencarbonate, potassium hydrogencarbonate, sodium carbonate and potassium carbonate. The solvent can be selected from those described concerning the step (A-1).

AS described above, the method II for the process of the present invention differs from the step (A-1) of the method I in respect of when the aromatic dihydroxy compound and the aromatic monohydroxy compound are allowed to react with phosphorus pentachloride. That is, in the step (A-2) of the method II, the aromatic dihydroxy compound and the aromatic monohydroxy compound are allowed to react with phosphorus pentachloride concurrently.

In the step (A-2) of the method II, it is sufficient to allow the aromatic dihydroxy compound and the aromatic monohydroxy compound to react with phosphorus pentachloride concurrently. A mixture of these two compounds may be introduced into the reaction system, or these two compounds may be introduced separately but at the same time. The amounts of the aromatic dihydroxy compound and the aromatic monohydroxy compound are as specified concerning the above step (A-1).

The reaction in the step (A-2) of the method II may be carried out in the absence of a solvent or in the presence of a proper solvent. When the solvent is used, it can be selected from those specified concerning the above step (A-1).

The above reaction in the step (A-2) is carried out at a temperature between −30° C. and 150° C., preferably between 10° C. and 130° C., for 0.5 to 15 hours, preferably 3 to 7 hours.

The intermediate polymer obtained in the step (A-2) of the method II gives the intended phosphate-based aromatic phosphorus-containing polymer by being hydrolyzed in the step B. The hydrolysis in this step B can be carried out in the same manner as in the step B of the method I under the same reaction conditions and reagents as those in the step B of the method I.

The intended phosphate-based aromatic phosphorus-containing polymer can be obtained by the above method I or II. The so-obtained phosphorus-containing polymer contains a three-dimensional structure, and therefore cannot be represented by a recurring unit. However, the structure of the phosphorus atom unit is considered to be formed mainly of the following units-1 and -2, and the terminal, is mostly considered to have the following unit-3.

unit-1

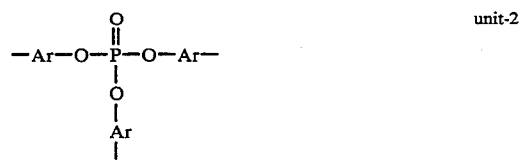

unit-2

unit-3

The aromatic phosphorus-containing polymer of the present invention is also considered to contain the following units-4, -5, and -6.

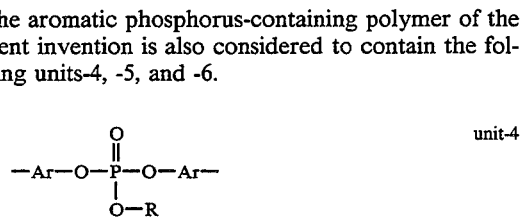

unit-4 unit-5

unit-6

In the above units-1 to -6, Ar is as defined in the formula (I), and Ar' is as defined in the formula (II). R is a hydrogen atom, an alkyl group having 1 to 4 carbon atoms or an alkali metal, and is determined depending upon the reagent used for the hydrolysis in the step B. Further, the units-1, -2 and -4 do not mean any recurring units of a general polymer, but show the structural features of the phosphorus atom unit. The units-3, -5 and -6 show the structural features of the terminal of the phosphorus atom unit.

The aromatic phosphorus-containing polymer obtained by the process of the present invention has no stereoisomerism, and its phosphorus atom unit and proportion can be easily determined by $^{31}P$ nuclear magnetic resonance spectrum when it is soluble in a solvent. The aromatic phosphorus-containing polymer formed by the reaction can be isolated by filtration, concentration or purification as required. The aromatic phosphorus-containing polymer obtained by the process of the present invention substantially does not contain chlorine atoms.

In the aromatic phosphorus-containing polymer obtained by the process of the present invention, the unit-1:unit-2 ratio is 10:0 to 10:10, and this ratio differs depending upon the kind and amount of the dihydroxy compound used in the step (A-1) or (A-2). Further, the above ratio also differs depending upon the reaction temperature. With an increase in the amount of the aromatic dihydroxy compound or with an increase in the reaction temperature, generally, the proportion of the unit-2 increases. Further, when the aromatic dihydroxy compound has no substituent on its nucleic carbon adjacent to the nucleic carbon to which OH group bonds, the proportion of the unit-2 increases.

The molecular weight of the aromatic phosphorus-containing polymer obtained by the process of the present invention differs depending upon the kinds and amounts of the aromatic dihydroxy compound and the aromatic monohydroxy compound and upon the reaction conditions, and the above molecular weight varies from a low molecular weight to a high molecular weight. In general, the aromatic phosphorus-containing polymer having a relative viscosity, measured at 20° C. as a 0.2 wt % dichloromethane solution, of 0.005 to 0.05 is useful. Some of those having a high crosslinking degree and a high molecular weight are insoluble in a solvent, and these are also included in the aromatic phosphorus-containing polymer of the present invention.

On the other hand, when the reactions in the methods I and II are carried out in the absence of the aromatic monohydroxy compound of the formula (II), the resultant phosphorus-containing polymer has a phosphorus atom unit structure composed mainly of the above units-2, -4 and -6 and none of the units-1, -3 and -5 are contained. This phosphorus-containing polymer tends to have a lower aromatic skeleton content, and tends to show lower heat resistance, than the polymer obtained according to the process of the present invention.

The aromatic phosphorus-containing polymer obtained by the process of the present invention is useful as a flame retardant, a stabilizer, a plasticizer, a compatibilizer and a lubricant for high molecular weight compounds. The high molecular weight compounds to be applied include polyolefin resins such as polyethylene and polypropylene; styrene resins such as polystyrene, high-impact polystyrene, an AS resin and an ABS resin; polyamide resins such as nylon-6 and nylon-6,6; polyester resins such as polyethylene terephthalate; a polysulfone resin; a polyacetal resin; a polycarbonate resin; and a polyphenylene ether resin. In particular, the aromatic phosphorus-containing polymer obtained by the process of the present invention is useful as a flame retardant for thermoplastic resins among the above high molecular weight compounds.

When the aromatic phosphorus-containing polymer is used as a flame retardant for the high molecular weight compound, the amount thereof differs depending upon the kind of the object high molecular weight compound and the required flame retardancy and cannot be definitely determined. Generally, however, the above amount per 100 parts by weight of the high molecular weight compound is 0.01 to 80 parts by weight, preferably 1 to 40 parts by weight. Further, the aromatic phosphorus-containing polymer may be as a flame retardant for the high molecular weight compound in combination with other halogen-containing flame retardant, other phosphorus-containing flame retardant, flame retardant aids such as antimony oxide and molybdenum oxide, fillers such as aluminum hydroxide. silica, alumina, mica and calcium sulfate and reinforcing fillers such as a glass fiber and a carbon fiber. Further, it may be used in combination with an effect amount of an antioxidant, an anti-aging agent, an ultraviolet absorbent, a lubricant, a mold releasing agent and a pigment.

EXAMPLES

The present invention will be explained more in detail with reference to Examples, in which "%" stands for "% by weight".

Comparative Example 1

A 500 ml reactor was charged with 7.36 g of phosphorus oxychloride, 28.7 g of 2,2-bis(4-hydroxy-3,5-dibromophenyl)propane, 100 g of chlorobenzene and 1.0 g of aluminum chloride, and these materials were allowed to react under solvent reflux for 8 hours. Then 3.62 g of phenol was added, and the resultant mixture was allowed to react at 100° C. For 3 hours. Thereafter, 3.0 g of methanol was added, and the resultant mixture was allowed to react at 60° C. for 2 hours. The solvent was distilled off, and 100 g of methanol was added to the residue. The resultant mixture was stirred under reflux for 20 minutes, and cooled. Then, the supernatant was removed by decantation, and the resultant solid was taken out of the reactor and dried to give 27 g of a phosphate-based aromatic phosphorus-containing polymer. The dichloromethane solution containing 0.2 % by weight of the above polymer showed a relative viscosity of 0.02.

Example 1

A 300 ml reactor was charged with 10 g of phosphorus pentachloride, 28.7 g of 2,2-bis(4-hydroxy-3,5-dibromophenyl)propane and 120 g of chlorobenzene, and these materials were allowed to react at room temperature for 4 hours. Then 3.62 g of phenol was added, and the resultant mixture was allowed to react at 100° C. for 3 hours. Thereafter, 3.0 g of methanol was added, and the resultant mixture was allowed to react at 60° C. for 2 hours. The solvent was distilled off, and 100 g of methanol was added to the residue. The resultant mixture was stirred under reflux for 20 minutes, and cooled. Then, the supernatant was removed by decantation, and the resultant solid was taken out of the reactor and dried to give 30 g of a phosphate-based aromatic phosphorus-containing polymer. The dichloromethane solution containing 0.2 % by weight of the above polymer showed a relative viscosity of 0.02.

The above polymer was measured by $^{31}P$ nuclear magnetic resonance spectrum to show that the unit-1:unit-2:unit-3:unit-4:unit-5:unit-6 ratio was about 100:58:33:67:17:0.5.

As compared with Comparative Example 1, the polymer was synthesized in the absence of a catalyst at a low temperature for a short period of time.

Comparative Example 2

100 Parts by weight of a polybutylene terephthalate (TRB-H, supplied by Teijin Limited) was mixed with 5 parts by weight of antimony trioxide (ATOX-S, supplied by Nippon Seiko K.K.), and the mixture was pelletized by means of an extruder at 210° C. The pellets were injection molded at a molding temperature of 210° C. to prepare a 5 inches × ½ inch × 1/16 inch test piece. The test piece was subjected to a combustion test according to UL-94 to show HB.

Example 2

100 Parts by weight of a polybutylene terephthalate (TRB-H, supplied by Teijin Limited). 5 parts by weight of antimony trioxide (ATOX-S, supplied by Nippon Seiko K. K. ) and 10 parts by weight of the phosphate-based aromatic phosphorus-containing polymer obtained in Example 1 were mixed, and the mixture was pelletized by means of an extruder at 210° C. The pellets were injection molded at a molding temperature of 210° C. to prepare a 5 inches 33 ½ inch×1/16 inch test piece. The test piece was subjected to a combustion test according to UL-94 to show V-2.

Example 3

A 300 ml reactor was charged with 10 g of phosphorus pentachloride, 15.0 g of 2,2-bis(4-hydroxy-3,5-dimethylphenyl)propane and 120 g of chlorobenzene, and these materials were allowed to react at room temperature for 4 hours. Then 3.62 g of phenol was added, and the resultant mixture was allowed to react at 100° C. for 3 hours. Thereafter, 3.0 g of methanol was added, and the resultant mixture was allowed to react at 60° C. for 2 hours. The solvent was distilled off, and 100 g of methanol was added to the residue. The resultant mixture was stirred under reflux for 20 minutes, and cooled. Then, the supernatant was removed by decantation, and the resultant solid was taken out of the reactor and dried to give 16 g of a phosphate-based aromatic phosphorus-containing polymer. The dichloromethane solution containing 0.2 % by weight of the above polymer showed a relative viscosity of 0.03.

Example 4

A 300 ml reactor was charged with 10 g of phosphorus pentachloride, 5.29 g of hydroquinone and 110 g of chlorobenzene, and these materials were allowed to react at 70° C. for 4 hours. Then 4.51 g of phenol was added, and the resultant mixture was allowed to react at 100° C. for 3 hours. Thereafter, 5.0 g of methanol was added, and the resultant mixture was allowed to react at 60° C. for 2 hours. The solvent was distilled off, and 200 g of hexane was added to the residue. The resultant mixture was stirred under reflux for 20 minutes, and cooled. Then, the supernatant was removed by decantation, and the oily substance was taken out of the reactor and dried to give 8.1 g of a phosphate-based aromatic phosphorus-containing polymer. The dichloromethane solution containing 0.2 % by weight of the above polymer showed a relative viscosity of 0.02.

The above polymer was measured by $^{31}P$ nuclear magnetic resonance spectrum to show that the unit-1:unit-2:unit-3:unit-4:unit-5:unit-6 ratio was about 100:300:26:42:26:32.

Example 5

A 300 ml reactor was charged with 10 g of phosphorus pentachloride, 5.81 g of resorcin and 110 g of chlorobenzene, and these materials were allowed to react at room temperature for 4 hours. Then 3.62 g of phenol was added, and the resultant mixture was allowed to react at 100° C. for 3 hours. Thereafter, 5.0 g of methanol was added, and the resultant mixture was allowed to react at 60° C. for 2 hours. The solvent was distilled off, and 200 g of hexane was added to the residue. The resultant mixture was stirred under reflux for 20 minutes, and cooled. Then, the supernatant was removed by decantation, and the oily substance was taken out of the reactor and dried to give 8.0 g of a phosphate-based aromatic phosphorus-containing polymer. The dichloromethane solution containing 0.2 % by weight of the above polymer showed a relative viscosity of 0.02.

The above polymer was measured by $^{31}P$ nuclear magnetic resonance spectrum to show that the unit-1:unit-2:unit-3:unit-4:unit-5:unit-6 ratio was about 100:31:34:31:31:11.

What is claimed is:

1. A process for the production of an aromatic phosphorus-containing polymer, which comprises the step of:
  (A) (A-1) reacting phosphorus pentachloride with 0.7 to 1.5 mol, per mole of the phosphorus pentachloride, of an aromatic dihydroxy compound of the formula (I),

wherein two OHs are present in positions where the two OHs do not bond to one phosphorus pentachloride molecule, and Ar is an aromatic hydrocarbon skeleton of the formula,

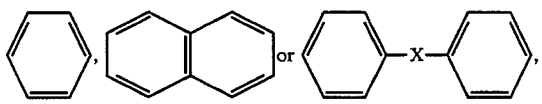

in which —X— is a single bond, —O—, —C(O), —CH$_2$—, —S—, —SO$_2$, an alkylidene group having 2 to 6 carbon atoms or a cycloalkyidene group having 3 to 6 carbon atoms, provided that Ar may be substituted with at least one substituent selected from the group consisting of a lower alkyl group a lower alkoxy group and a halogen atom, at a temperature between −30° C. and 150° C. for 0.5 to 12 hours to form a reaction product, and
  (B) reacting the reaction product with 1.0 to 3.0 mol, per mole of the phosphorus pentachloride, of an aromatic monohydroxy compound of the formula (II)

wherein Ar' is an aromatic hydrocarbon skeleton selected from those defined as Ar in the formula (I), at a temperature between 0° C. and 150° C. for 0.5 to 6 hours to form an intermediate polymer, and
  (C) reacting the intermediate polymer with water, a C$_1$-C$_4$ alkyl alcohol, an aqueous alcoholic solution of said alcohol or an aqueous alkaline solution, at a temperature of 0° C. to 150° C. for 0.1 to 6 hours.

2. The process of claim 1 wherein the alcohol or aqueous alcoholic solution is in an amount of 1 to 10,000 mol per mol of the phosphorus pentachloride used in step (A), or the amount of aqueous alkaline solution is in an amount of 0.1 to 10 mol per mole of the phosphorus pentachloride used in the step (A).

3. The process of claim 1 wherein the step (A) is carried out in a solvent.

4. The process of claim 1 wherein the steps (A) and (B) are combined and carried out concurrently at a temperature of −30° C. to 150° C. for 0.5 to 15 hours to form said intermediate polymer.

5. The process of claim 1 wherein an aromatic phosphorus-containing polymer is recovered and has a relative viscosity, measured at 20° C. as a 0.2 wt. % dichloromethane solution of 0.005 to 0.05.

6. A flame-retardant resin compostion containing 100 parts by weight of a thermoplastic resin and 0.01 to 80 parts by weight of the aromatic phosphorus-containing polymer obtained by the process recited in claim 1.

7. A process for the production of an aromatic phosphorus-containing polymer, which consists essentially of the step of:
(A) (A-1) reacting phosphorus pentachloride with 0.8 to 1.2 mol, per mole of the phosphorus pentachloride, of an aromatic dihydroxy compound of the formula (I), HO—Ar—OH    (I)

wherein two OHs are present in positions where the two OHs do not bond to one phosphorus pentachloride molecule, and Ar is an aromatic hydrocarbon skeleton of the formula,

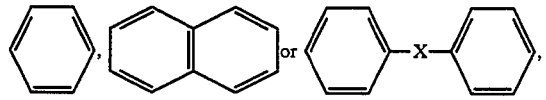

in which —X— is a single bond, —O—, —C(O), —CH$_2$—, —S—, —SO$_2$, an alkylidene group having 2 to 6 carbon atoms or a cycloalkyidene group having 3 to 6 carbon atoms, provided that Ar may be substituted with at least one substituent selected from the group consisting of a lower alkyl group, a lower alkoxy group and a halogen atom, at a temperature between 10° C. and 120° C. for 2 to 5 hours to form a reaction product, and
(B) reacting the reaction product with 1.2 to 2.5 mol, per mole of the phosphorus pentachloride, of an aromatic monohydroxy compound of the formula (II)

HO—Ar'    (II)

wherein Ar' is an aromatic hydrocarbon skeleton selected from those defined as Ar in the formula (I), at a temperature between 10° C. and 130° C. for 2 to 5 hours to form an intermediate polymer, and
(C) reacting the intermediate polymer with water, a C$_1$–C$_4$ alkyl alcohol, an aqueous alcoholic solution of said alcohol or an aqueous alkaline solution, at a temperature of 20° C. to 90° C. for 0.2 to 3 hours.

8. The process of claim 7 wherein the alcohol or aqueous alcoholic solution is in an amount of 2 to 5,000 mol per mol of the phosphorus pentachloride used in step (A), or the amount of aqueous alkaline solution is in an amount of 1 to 7 mol per mole of the phosphorous pentachloride (A).

9. The process of claim 7 wherein the step (A) is carried out in an organic solvent.

10. The process of claim 7 wherein the steps (A) and (B) are combined and carried out concurrently at a temperature of 10° to 130° C. for 3 to 7 hours to form said intermediate polymer.

11. The process of claim 7 wherein an aromatic phosphorous containing polymer is recovered and has a relative viscosity, measured at 20° C. as a 0.2 wt. % dichloromethane solution of 0.005 to 0.05.

12. A flame-retardant resin composition containing 100 parts by weight of a thermoplastic resin and 1 to 40 parts by weight of the aromatic phosphorus-containing polymer obtained by the process recited in claim 7.

13. A process for the production of an aromatic phosphorus-containing polymer, which consists essentially of the step of:
(A) (A-1) reacting phosphorus pentachloride with 0.8 to 1.2 mol, per mole of the phosphorus pentachloride, of an aromatic dihydroxy compound of the formula (I), HO—Ar—OH    (I)

wherein two OHs are present in positions where the two OHs do not bond to one phosphorus pentachloride molecule, and Ar is an aromatic hydrocarbon skeleton of the formula,

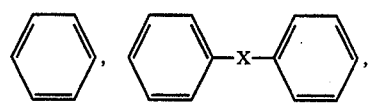

in which —X— is an alkylidene group having 2 to 6 carbon atoms, provided that Ar may be substituted with at least one substituent selected from the group consisting of a lower alkyl group, a lower alkoxy group and a halogen atom, at a temperature between 10° C. and 120° C. for 2 to 5 hours to form a reaction product, and
(B) reacting the reaction product with 1.2 to 2.5 mol, per mole of the phosphorus pentachloride, of an aromatic monohydroxy compound of the formula (II)

HO—Ar'    (II)

wherein Ar' is,

provided that Ar' may be substituted with at least one substituent selected from the group consisting of a lower alkyl group, a lower alkoxy group, and a halogen atom to form an intermediate polymer, and
(C) reacting the intermediate polymer with water, a C$_1$–C$_4$ alkyl alcohol or an aqueous alcoholic solution of said alcohol, at a temperature of 20° to 90° C. for 0.2 to 3 hours.

14. The process of claim 13 wherein Ar is a member selected from the group consisting of 2,2-bis(4-hydroxy-3,5-dibromophenyl) propane, 2,2-bis(4-hydroxy-3,5-dimethyl phenyl) propane, hydroquinone and resorcin.

15. The process of claim 13 wherein Ar' is phenol.

16. The process of claim 13 wherein the alcohol or aqueous alcoholic solution is in an amount of 1 to 10,000 mol per mol of the phosphorus pentachloride used in step (A), or aqueous alkaline solution is in an amount of 0.1 to 10 mol per mole of the phosphorus pentachloride used in the step (A).

17. The process of claim 13 wherein the step (A) is carried out in an organic solvent.

18. The process of claim 13 wherein the steps (A) and (B) are combined and carried out concurrently at a temperature of 10° C. to 130° C. for 3 to 7 hours to form said intermediate polymer.

19. The process of claim 13 wherein an aromatic phosphorus-containing polymer is recovered and has a relative viscosity, measured at 20° C. as a 0.2 wt. % dichloromethane solution of 0.005 to 0.05.

20. A flame-retardant resin compostion containing 100 parts by weight of a thermoplastic resin and 1 to 40 parts by weight of the aromatic phosphorus-containing polymer obtained by the process recited in claim 13.

* * * * *